(12) United States Patent
Bowman et al.

(10) Patent No.: US 11,816,177 B2
(45) Date of Patent: Nov. 14, 2023

(54) STREAMING STATIC WEB PAGE GENERATION

(71) Applicant: Yext, Inc., New York, NY (US)

(72) Inventors: Matthew Bowman, Alexandria, VA (US); Bryan Reed, Arlington, VA (US); Pranjal Singh, New York, NY (US); Matthew Kilpatrick, Arlington, VA (US); Austin Chu, New York, NY (US); Gideon Weiler, New York, NY (US)

(73) Assignee: Yext, Inc., New York, NY (US)

( * ) Notice: Subject to any disclaimer, the term of this patent is extended or adjusted under 35 U.S.C. 154(b) by 0 days.

(21) Appl. No.: 17/513,685

(22) Filed: Oct. 28, 2021

(65) Prior Publication Data

US 2023/0028620 A1 Jan. 26, 2023

Related U.S. Application Data

(60) Provisional application No. 63/255,664, filed on Oct. 14, 2021, provisional application No. 63/224,228, filed on Jul. 21, 2021.

(51) Int. Cl.
*G06F 16/958* (2019.01)
*G06F 16/957* (2019.01)

(52) U.S. Cl.
CPC .......... *G06F 16/972* (2019.01); *G06F 16/957* (2019.01); *G06F 16/986* (2019.01)

(58) Field of Classification Search
CPC ..... G06F 16/972; G06F 16/957; G06F 16/986
See application file for complete search history.

(56) References Cited

U.S. PATENT DOCUMENTS

| | | | | |
|---|---|---|---|---|
| 6,571,282 | B1 * | 5/2003 | Bowman-Amuah | ........................ H04L 67/303 719/329 |
| 7,809,698 | B1 * | 10/2010 | Salz | ...................... H04L 67/564 707/694 |
| 7,814,410 | B2 * | 10/2010 | Kothari | ............... G06F 16/9577 715/234 |
| 7,818,665 | B1 * | 10/2010 | Russin | .................. G06F 40/143 715/239 |

(Continued)

FOREIGN PATENT DOCUMENTS

| | | | |
|---|---|---|---|
| CA | 2348706 | A1 * | 11/2002 |
| CN | 104063431 | A  * | 9/2014 |

(Continued)

OTHER PUBLICATIONS

PCT Notification of Transmittal Of The International Search Report And The Written Opinion Of The International Searching Authority for PCT Application No. PCT/US2022/037103, dated Aug. 9, 2022, 7 pages.

*Primary Examiner* — Shahid K Khan
(74) *Attorney, Agent, or Firm* — Lowenstein Sandler LLP

(57) ABSTRACT

A system and method to generate a website for a user system. The system and method generating, in a first phase, a set of static assets associated with the website of the user system. In a second phase, a set of web pages based on one or more data streams including data associated with the user system is generated. The system and method provision the set of static assets and the set of web pages of the website to the user system.

20 Claims, 7 Drawing Sheets

(56) References Cited

U.S. PATENT DOCUMENTS

| | | | | |
|---|---|---|---|---|
| 8,595,308 B1* | 11/2013 | Kloba | | H04L 67/568 709/227 |
| 9,798,524 B1* | 10/2017 | Colton | | G06F 16/972 |
| 10,148,735 B1* | 12/2018 | Kolam | | H04L 67/02 |
| 10,187,319 B1* | 1/2019 | Kumar | | H04L 67/1001 |
| 10,846,526 B2* | 11/2020 | Carpenter | | G06F 40/131 |
| 11,074,270 B2* | 7/2021 | Deshmukh | | G06F 16/27 |
| 2002/0188613 A1* | 12/2002 | Chakraborty | | G06F 16/9027 |
| 2004/0205564 A1* | 10/2004 | Brayton | | H04L 9/40 707/E17.117 |
| 2004/0254905 A1* | 12/2004 | Tiku | | G06F 16/957 707/E17.119 |
| 2005/0027823 A1* | 2/2005 | Rana | | G06F 16/9577 709/219 |
| 2005/0198121 A1* | 9/2005 | Daniels | | G06Q 10/10 709/203 |
| 2006/0047728 A1* | 3/2006 | Kim | | G06F 16/957 |
| 2006/0195779 A1* | 8/2006 | McElroy | | G06F 16/972 715/204 |
| 2007/0198543 A1* | 8/2007 | Nguyen | | G06F 16/86 |
| 2008/0263052 A1* | 10/2008 | Parsell | | G06F 16/958 |
| 2009/0044103 A1* | 2/2009 | Chalecki | | G06F 16/33 715/234 |
| 2012/0110002 A1* | 5/2012 | Giambalvo | | G06F 40/186 707/769 |
| 2012/0110433 A1* | 5/2012 | Pan | | G06F 40/103 715/234 |
| 2012/0110437 A1* | 5/2012 | Pan | | G06F 16/9574 715/235 |
| 2013/0212227 A1* | 8/2013 | Thomas | | H04L 65/1069 709/227 |
| 2014/0040367 A1* | 2/2014 | Lessin | | G06Q 50/01 709/204 |
| 2015/0006512 A1* | 1/2015 | Alfonseca | | G06F 40/258 707/722 |
| 2015/0143224 A1* | 5/2015 | Kennedy | | G06F 16/9574 715/234 |
| 2015/0149565 A1* | 5/2015 | Ahmed | | H04L 65/401 709/204 |
| 2015/0358394 A1* | 12/2015 | Pall | | G06F 16/957 709/217 |
| 2016/0140668 A1* | 5/2016 | Maguire | | G06Q 40/123 705/31 |
| 2016/0205166 A1* | 7/2016 | Kolam | | H04L 67/01 709/213 |
| 2017/0230442 A1* | 8/2017 | Denoual | | H04L 47/83 |
| 2017/0235829 A1* | 8/2017 | Han | | G06F 16/951 707/706 |
| 2018/0210965 A1* | 7/2018 | Grigoryan | | G06F 16/957 |

FOREIGN PATENT DOCUMENTS

| | | | |
|---|---|---|---|
| CN | 108090156 A | * | 5/2018 |
| JP | 2003288332 A | * | 10/2003 |
| WO | WO-0157721 A2 | * | 8/2001 |
| WO | WO-0190873 A1 | * | 11/2001 |
| WO | WO-2016112354 A2 | * | 7/2016 |

* cited by examiner

STREAMING STATIC WEB PAGE GENERATION

CROSS REFERENCE TO RELATED APPLICATIONS

This application claims the benefit of U.S. Provisional Patent Application No. 63/224,228, filed Jul. 21, 2021 and U.S. Provisional Patent Application No. 63/255,664, filed on Oct. 14, 2021, the entireties of which are incorporated herein by reference.

TECHNICAL FIELD

Embodiments of the disclosure are generally related to data processing and publishing, and more specifically, are related to a distributed data processing and publishing platform associated with data collected from multiple data sources.

BACKGROUND

A typical static site generation and deployment system includes two separate portions: 1) a Static Site Generator (SSG) which is an application that generates HTML web pages and assets and 2) a deployment system, which is the system that will actually run the SSG application and host the resulting web pages. SSGs expose a build command, which can be called to trigger the process of generating web pages. The build command can be executed locally on an individual machine and the resulting HTML is stored locally. More commonly, the deployment system calls the SSG build command in the cloud, whenever a new deployment of the site is pushed. Importantly, the build, or the process for generating HTML web pages, is a single step. In order to build web pages from an external data source, a user system is required to set up an integration in the user system's deployment system. At some point in the deployment process, the typical system is required to call out to the data source, retrieve a set of data, and feed the data to the SSG in order to then generate the relevant web pages. When the source data changes, the deployment system must listen for these changes and trigger a new build using the updated data. The deployment system is forced to run the build command again, regenerating the entire site using the latest data. As a result, there is a single build command that is triggered by the deployment system in response to various events such as data changes or code changes.

BRIEF DESCRIPTION OF THE DRAWINGS

The present disclosure is illustrated by way of example, and not by way of limitation, and can be more fully understood with reference to the following detailed description when considered in connection with the figures as described below.

DETAILED DESCRIPTION

The present application relates to methods and systems to statically generate web pages based on external data sources for enterprise-scale websites. Streaming static generation provides previously unattainable levels of build-time performance and scalability in a manner that is advantageous as compared to typical web site generating technologies. While other technologies can generate a high-volume of pages, those systems can only do so at a duration on the order of hours or days. Long-running processes such as these are not operationally tractable for enterprise websites, with source data that can change hundreds of times an hour. The aforementioned slowness has prevented static generation from being widely adopted as an approach to web development for enterprise-scale websites. Streaming static generation provides build-time performance and scalability that makes static generation operationally tractable for websites with a large number of web pages based on a data source with a large number of updates.

The present application includes a method and system (herein referred to as a "streaming static web page generation system") configured to segment or split the process of deploying a static site into three independent phases. According to embodiments, the streaming static web page generation system addresses and overcomes the limitations and disadvantages described above in connection with typical systems. In an embodiment, the streaming static web page generation system divides the deployment process into three independent phases: 1) the initial build; 2) page generation; and 3) ongoing data update processing. By decoupling these phases, the streaming static web page generation system provides processing environments that are uniquely optimized for distinct responsibilities of each phase, yielding an overall faster performance, compared with comparable technologies. In an embodiment, the streaming static web page generate system utilizes stream processing rather than batch processing in dynamically generating HTML content of the web pages.

According to embodiments, the streaming static web page generation system of present disclosure captures the output of the deployment process described above as a "deploy." A deploy is a fully rendered version of the site, based on the toolchain, templates, and data at the time of the deployment. One deploy, or version of the site, is public or published to the production domain of the site. That is, when consumers visit the domain of the site, they will see the contents of that deploy at the relevant URLs.

Publishing a different deployment to the public domain of a site takes seconds as all the files are already generated and hosted. The streaming static web page generation system needs only to change the network settings of the hosting provider so traffic is directed to pre-existing files of the newly published deploy (e.g., implementing "pointer-switch" publishing).

Figure 1:
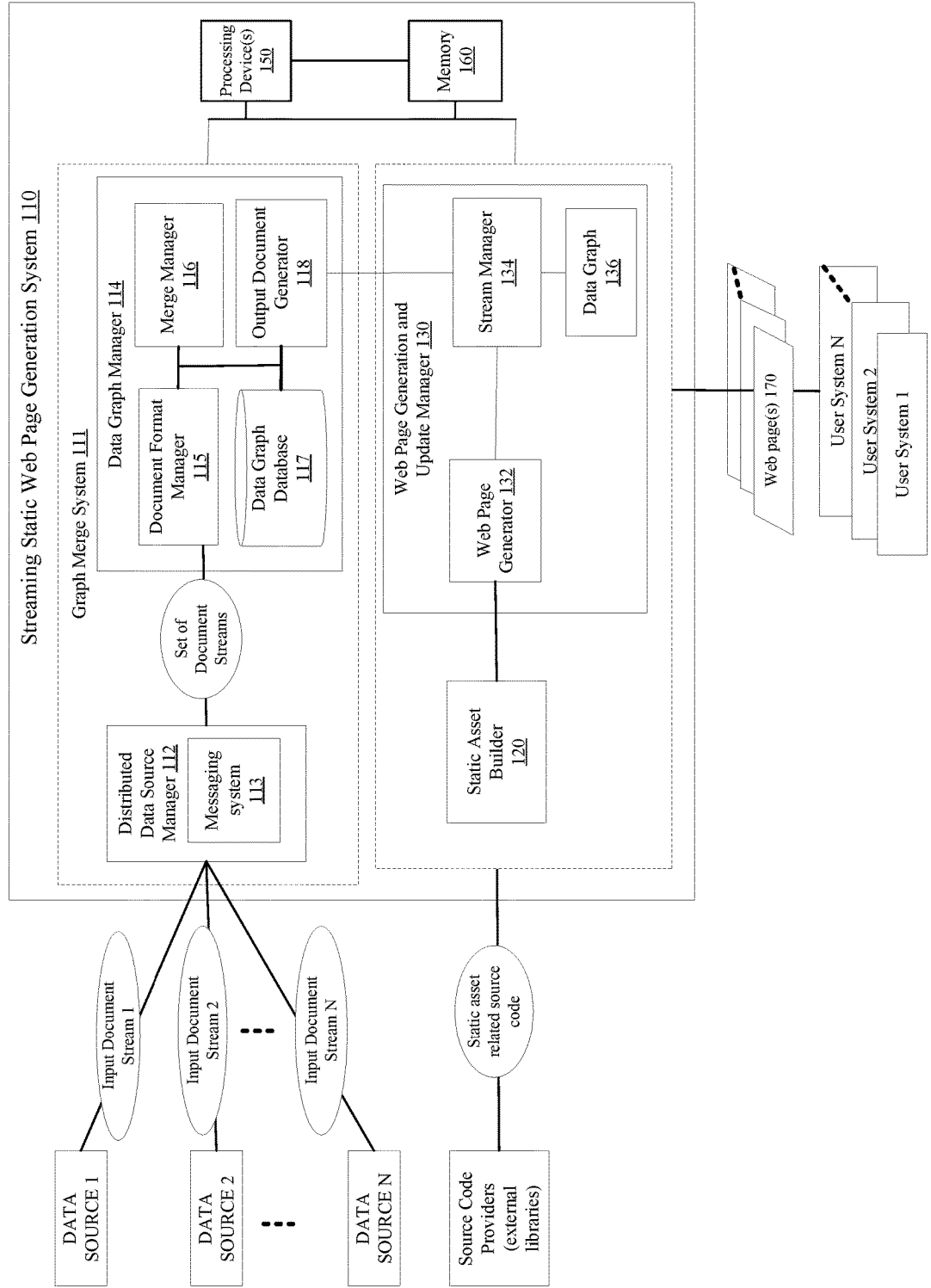
FIG. 1 illustrates an example of a computing environment including a streaming static web page generation system to generate web pages including a content portion and static assets for a website associated with a user system, in accordance with one or more aspects of the disclosure.

FIG. 1 illustrates an example computing environment 100 including a static system 110 communicatively connected to one or more data sources (e.g., data source 1, data source 2 . . . data source N) and one or more user systems (e.g., user system 1, user system 2 . . . user system X). The streaming web page generation system 110 generates and provisions web pages 170 to the one or more user systems. The streaming web page generation system 110 generates the web pages according to a multi-phase process including an initial build phase (Phase 1), a web page generation phase (Phase 2) and a data updating phase (Phase 3), described in greater detail below with reference to FIGS. 1-3. In an embodiment, the user systems may be any suitable computing device (e.g., a server, a desktop computer, a laptop computer, a mobile device, etc.) associated with a user (e.g., a company) associated with a website including one or more web pages generated by the streaming web page generation system 110. The streaming web page generation system 110 may be communicatively connected to the user systems via a suitable network. In an embodiment, the streaming web page generation system 110 may be accessible and executable on one or more separate computing devices (e.g., servers).

According to embodiments, the streaming web page generation system 110 can include one or more software and/or hardware modules to perform the operations, functions, and features described herein in detail, including a static asset builder 120, a web page generation and update manager 130, one or more processing devices 150 and one or more memory devices 160 (e.g., memory devices to store instructions executable by the one or more processing devices 150 to perform the operations and functions described herein. In one embodiment, the components or modules of the streaming web page generation system 110 may be executed on one or more computer platforms of a system associated with an entity that are interconnected by one or more networks, which may include a wide area network, wireless local area network, a local area network, the Internet, etc. The components or modules of the streaming web page generation system 110 may be, for example, a hardware component, circuitry, dedicated logic, programmable logic, microcode, etc., that may be implemented in the processing device of the knowledge search system.

In an embodiment, the streaming web page generation system 110 includes a graph merge system 111 to manage user knowledge graphs (e.g., data graph 136) based on the input data streams from the disparate data sources and generates output document streams (also referred to as "streams") for use by the web page generation and update manager 130 in generating web pages 170. The generation of the streams and processing of the streams by the stream manager 134 of the web page generation and update manager 130 are described in greater detail below.

In an embodiment, the streams are generated by the graph merge system 111 and provided to the stream manager 134 for processing in the generation of the web pages 170. In an embodiment, the graph merge system 111 includes a distributed data source manager 112 including a messaging system 113, a data graph manager 114 including a document format manager 115, a merge manager 116, a data graph database 117, and an output document generator 118. In an embodiment, the generated streams are supplied to the stream manager 134 by the output document generator 118 for use in the web page generation phase (Phase 2) and the web page updating phase (Phase 3). According to embodiments, the graph merge system 111 manages and maintains a data graph corresponding to the data associated with the one or more user systems (also referred to as the respective knowledge graphs 136 corresponding to the user systems), as described in greater detail below.

In an embodiment, the static asset builder 120 is configured to generate the static assets (e.g., artifacts) that make up the "static" portion or frontend of a website (e.g., infrastructure or environmental framework) associated with a user system. In an embodiment, the static asset builder 120 generates the frontend or static assets, not including the HTML content or web pages based on the data associated with the user system. For example, the static assets or artifacts can include, but are not limited to, cascading style sheets (CSS), JavaScript files, font files, and images. In an embodiment, the static asset builder 120 is configured to collect static asset related source code from one or more source code providers (e.g., external libraries). In an embodiment, the static asset builder 120 can interact with the source code providers to employ one or more frameworks and open-source libraries to generate the static assets and optimize the static assets for production (also referred to as a "build-chain" or "tool-chain"). Advantageously, the tool-chain phase (Phase 1) and web page generation phase (Phases 2 and 3) are separated, as described in greater detail below.

In an embodiment, the static asset builder 120 implements a processing environment for the initial build which allow user systems to specify a custom build-chain, gather the required external libraries onto a single container image in a cloud instance of a cloud computing environment, execute the specified build-chain, and capture the resulting static assets for implementation in the web site. In an embodiment, the initial build phase implemented by the static asset builder is performed independently of the data source (e.g., the static asset builder 120 does not interact with the one or more data sources (e.g., data source 1, data source 2 . . . data source N of FIG. 1). In this regard, the web page generation and update manager 130 is responsible for generating web pages based on the data records, while the static asset builder 120 is responsible for generating the "supporting" assets or elements (e.g., stylesheets, JavaScript files, templates, etc.) that are used on the "final" generated web pages. In an embodiment, the static assets may include templates used in the web page generation and update phases of the process. In an embodiment, one or more toolchain implementations may mutate the templates, such that the static asset generation phase is r In an embodiment, a developer can execute an arbitrary frontend build-chain in the cloud and capture the output. The frontend or static asset build can be a time-consuming, one-time event, as complex frontend projects may need to compile down source-code from various external libraries (e.g., source code providers). In an embodiment, the static asset builder 120 of the streaming static web page generation system 110 executes the initial build (Phase 1) and then the streaming static web page generation 110 continues to the next phase (i.e., the page generation phase).

In an embodiment, the static asset builder 120 employs the builds or user system-defined pipeline to generate the static assets or artifacts (e.g., templates) that are used by the web page generation and update manager 130 in generating the web pages 170. The one or more builds can be queued using a handler module. In an embodiment, a build can be queued in response to an event, such as a webhook, a push event, a pull request action, etc. In an embodiment, the queued builds can be stored in a database that can be polled (e.g., periodically) by a process (e.g., a daemon process) to identify any available builds. When a build is dequeued, the static asset builder 130 can create unique resources in a shared namespace in preparation of running the build. In an embodiment, the static asset builder 130 creates a deployment in a build namespace with a most recent image. Each build can be associated with one or more environment variables. In an embodiment, the environment variables may include aspects of the website's source code that vary per branch in the source code (e.g., aspects that are not hard-coded). Example environment variables include an API key used by frontend code, a key that is used by a build toolchain to perform an operation during the build phase that is not included in the source code, a secret key for an API, an indicator of a target environment (e.g., production, development, etc.) etc. In an embodiment, a developer can use an environment variable to alter the output of a build process based on where the build is running and where it is intended to run.

After the deployment is ready (e.g., a pod has been created and ready checks have been performed), the associated environment variables are fetched, and a port forwarding session is started. In an embodiment, a web server of the static asset builder 130 can build a preview image and the static assets in parallel. In an example, the preview image may be a docker image that is uploaded to an environment specific dynamic registry (e.g., separate container registries used for storing images related to the dynamic cluster). In an embodiment, the preview image runs a server (e.g., an open source high performance Remote Procedure Call (RPC) framework in which a client application can directly call methods on a server application on a different machine as if it was a local object) that exposes an application programming interface (API) to manage a user system's repository and the user system's application server that runs the website of the user system. In an embodiment, the artifacts may be compressed and contain all of the repository's specified build outputs (e.g., optimized static files and templates that are used to generate a static site by the web page generator 132).

In an embodiment, a user system can preview their respective website by executing the image associated with the user system's build. In an embodiment, an interface is provided by the streaming web page generation system 110 which enables the creation of a preview deployment (e.g., preview session) in which the user system can interact with the user system's repository.

Figure 2:
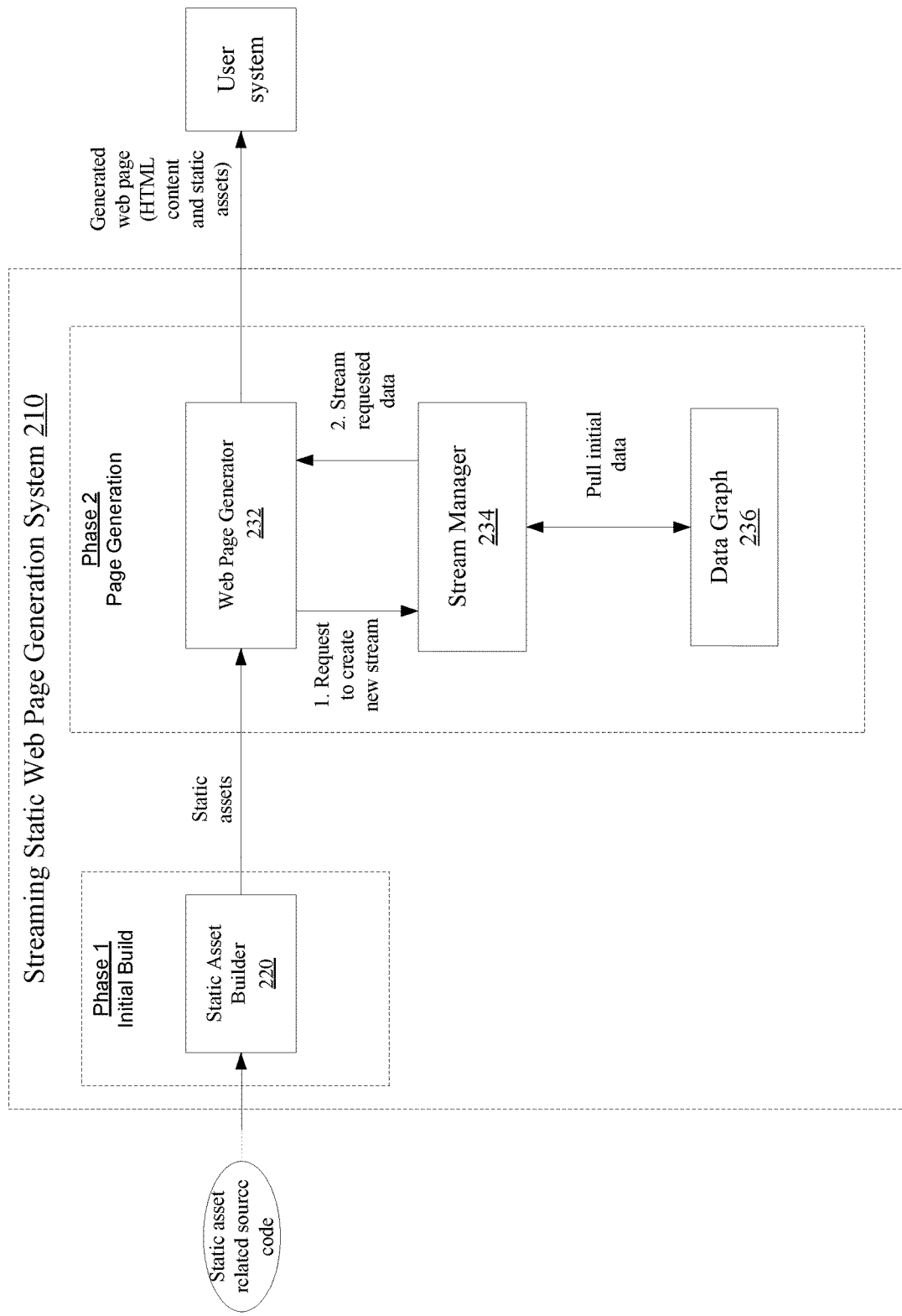
FIG. 2 illustrates an example streaming static web page generation system including components configured to execute a static asset generation phase and an initial deploy of one or more web pages to generate a web site of a user system, in accordance with one or more aspects of the disclosure.

FIG. 2 illustrates an example streaming static web page generation system 210 including a static asset builder 220 configured to execute an initial build phase (Phase 1). As illustrated in FIG. 2 and in accordance with the above description, the static asset builder 220 receives the static asset-related source code and generates the static assets to be integrated with HTML content (during phases 2 and 3) as part of a website generated and provisioned to a user system. As illustrated in FIG. 2, the static asset building phase (Phase 1) is performed independently of Phases 2 and 3.

With reference to FIG. 1, the web page generation and update manager 130 is configured to generate the HTML web pages that make up the web site. The web pages are generated based on data records from an external data source. In an embodiment, the web page generation and update manager 130 incudes a web page generator 132, a stream manager 134 and a data graph 136 associated with a respective user system. The web page generator 132 is configured to receive streams of data associated with a user system from the stream manager 134 for use is generating the web pages for the website of the user system. Unlike the initial build, which is a time-consuming, one-time event, the act of generating each individual web page is a highly repetitive event. The same process occurs for every data record. For example, for enterprise websites, these HTML generation events occur hundreds of thousands or millions of times.

According to embodiments, the streaming web page generation system 110 employs the stream manager 134 to manage the "stream processing" to the domain of static site generation. As described above, the streaming web page generation system 110 includes the web page generation and update manager 130 for the page generation phase (i.e., Phase 2), where the streaming web page generation system 110 can parallelize the individual page generation events. Stream processing is employed to enable the streaming web page generation system 110 to exploit parallelization in this manner. The stream processing employed by the streaming web page generation system 110 represents an improvement in contrast with the batch processing employed by typical systems. With batch processing, applications process batches of data based on a schedule or a predefined threshold (every night at 12 μm; every 100 new records). As such, in certain conventional systems, the application processes multiple data records at once and the batches can be variable sizes. Advantageously, the stream manager 134 process events in real-time as they arise. Stream processing is most suitable for applications where there is a high degree of independence between the records or events in question. The same function can be applied to all the records in the input stream. This allows applications to parallelize the computation, or execute the function on multiple records simultaneously.

In an embodiment, the web page generation and update manager 130 performs the act of rendering content portions (e.g., HTML content) of a webpage based on a given data record. In an embodiment, this function may be applied for every record in the external data source (e.g., the data graph 136) used for the website. As a consequence, the web page generation and update manager 130 can render multiple pages simultaneously, in multiple threads across multiple computing machines, resulting in previously unattainable levels of performance and scalability.

According to embodiments, in order to apply stream processing to the domain of static generation, the streaming web page generation system 110 parallelizes multiple steps in the overall pipeline including: data ingestion; page generation; and write operations to the cloud. Additionally, the streaming web page generation system 110 tracks status across these events in the pipeline to provide feedback (e.g., feedback to a human operator) of the streaming web page generation system 110.

In an embodiment, the stream manager 134 manages streams received from a streaming system (e.g., the graph merge system 111) which pushes data records to the web page generation and update manager 130. In an embodiment, the graph merge system 111 generates a published output document stream in accordance with schemas established by each of the user systems. The published output document stream includes multiple documents (e.g., having multiple document types) that are formatted in accordance with the user-system schema to enable the output of data to the end-user systems (e.g., in response to a search query from an end-user system). In an embodiment, document types can include, but are not limited to, an entity type (e.g., a document including data associated with an entity (e.g., a person, a store location, etc.) associated with the user system, a listings type (e.g., a document including data associated with a review associated with a user system), and a review type (e.g., a document including data relating to a review associated with a user system).

In an embodiment, the graph merge system 111 can transmit a file including a dataset associated with a published output document stream to a user system on a periodic basis. In an embodiment, the graph merge system 111 can send a notification to a user system, where the notification is associated with an update to the published output document stream. According to embodiments, the graph merge system 111 may be communicatively coupled to a user system via any suitable interface or protocol, such as, for example, application programming interfaces (APIs), a web browser, JavaScript, etc. In an embodiment, the graph merge system 111 is coupled to the memory 160 which store instructions executable by the one or more processing devices 150 to perform the instructions to execute the operations, features, and functionality described in detail with respect to the graph merge system 111.)

As shown in FIG. 1, the graph merge system 111 is communicatively connected to one or more data sources (e.g., data source 1, data source 2 . . . data source N) and one or more user systems (e.g., user system 1, user system 2 . . . user system X). The graph merge system 111 provides a distributed data graph (also referred to as a "data graph" "knowledge graph" or "user data graph") publishing platform. The graph merge system 111 receives input document streams (e.g., input document stream 1, input document stream 2 . . . input document stream N) from the one or more data sources. The graph merge system 111 merges the data of the multiple input document streams into a corresponding user data graph for the respective user systems (e.g., user system 1, user system 2 . . . user system N) that is persisted in a database (e.g., data graph database 117) of the graph merge system 111. For example, the user systems may be any suitable computing device (e.g., a server, a desktop computer, a laptop computer, a mobile device, etc.) associated with a user system (e.g., a company) associated with a data graph managed and maintained by the graph merge system 111.

According to embodiments, the graph merge system 111 manages the user knowledge graphs based on the input data streams from the disparate data sources and generates output document streams for publication to the respective user systems for provisioning to one or more end-user systems (not shown). As used herein, the term "end-user" refers to one or more users operating an electronic device (e.g., end-user system 1) to submit a request for data (e.g., a webpage request, a search query, etc.) to a user system (e.g., user system 1, user system 2 . . . user system X).

In an embodiment, the graph merge system 111 generates a published output document stream in accordance with schemas established by each of the user systems. The published output document stream includes multiple documents (e.g., having multiple document types) that are formatted in accordance with the user-system schema to enable the output of data to the end-user systems (e.g., in response to a search query from an end-user system). In an embodiment, document types can include, but are not limited to, an entity type (e.g., a document including data associated with an entity (e.g., a person, a store location, etc.) associated with the user system, a listings type (e.g., a document including data associated with a review associated with a user system), and a review type (e.g., a document including data relating to a review associated with a user system).

The graph merge system 111 may be communicatively connected to the user systems via a suitable network. In an embodiment, the graph merge system 111 may be accessible and executable on one or more separate computing devices (e.g., servers). In an embodiment, the graph merge system 111 can transmit a file including a dataset associated a published output document stream to a user system on a periodic basis. In an embodiment, the graph merge system 111 can send a notification to a user system, where the notification is associated with an update to the published output document stream. According to embodiments, the graph merge system 111 may be communicatively coupled to a user system via any suitable interface or protocol, such as, for example, application programming interfaces (APIs), a web browser, JavaScript, etc.

According to embodiments, the graph merge system 111 can include one or more software and/or hardware modules to perform the operations, functions, and features described herein in detail, including a distributed data source manager 112 including a messaging system 113, a data graph manager 114 including a document format manager 115, a merge manager 116, a data graph database 117, and a output document generator 118, the one or more processing devices 150, and the one or more memory devices 160. In one embodiment, the components or modules of the graph merge system 111 may be executed on one or more computer platforms of a system associated with an entity that are interconnected by one or more networks, which may include a wide area network, wireless local area network, a local area network, the Internet, etc. The components or modules of the graph merge system 111 may be, for example, a hardware component, circuitry, dedicated logic, programmable logic, microcode, etc., that may be implemented in the processing device of the knowledge search system.

In an embodiment, the distributed data source manager 112 includes a messaging system 113 configured to receive input document streams from multiple data sources (e.g., data source 1, data source 2 . . . data source N). The input document streams include one or more document messages including one or more documents (e.g., a file or other data object that can be electronically transmitted and stored) including data relating to a user system having a data graph managed by the data graph manager 114 of the graph merge system 111. In an embodiment, the messaging system 113 may include a messaging layer configured to read one or more document messages of the input document streams received from the multiple data sources (e.g., data sources such as a software as a service (SAAS) platform, Google™, Yelp™, Facebook™ Bing™, Apple™, Salesforce™, Shopify™, Magento™, a user system (e.g., a source of data relating to a user system that is managed and maintained by the user system), or and other search service providers). In an embodiment, one or more messaging channels are established with the respective data sources to enable transmission of the document messages of the input document streams that are received and processed by the distributed data source manager 112 of the graph merge system 111.

In an embodiment, the messaging system 113 can be configured to receive input document streams from one or more suitable messaging platforms. For example, the messaging system 113 can be configured to interact with a publish-subscribe based messaging system configured to exchange data between processes, application, and servers (e.g., the Apache Kafka® distributed streaming platform). In an embodiment, the messaging system 113 is configured to interact with a publish and subscribe based messaging system to receive the document input streams. In an embodiment, the messaging system 113 is configured to receive document input streams from one or more clusters of servers of the messaging system. In an embodiment, a cluster of the messaging system is configured to store streams of document messages organized or grouped according to a parameter (e.g., a topic), where each document message is associated with identifying information (e.g., a key, a value, and a timestamp). In an embodiment, a topic is used to identify a persistent queue of documents. In an embodiment, a topic identifies documents that are produced by the graph database and are to be processed by the streaming web page generation system 110. In an embodiment, the topic can be a category or document stream feed name to which document messages (or records) are published. A topic can include a category used to organize messages, where each topic has a name that is unique across a cluster. Messages can be sent to and read from specific topics, where producers write data to topics, and consumers read data from topics.

In an embodiment, the messaging system 113 can include a listener module configured to listen for document updates in the multiple data sources. In an embodiment, the messaging system 113 can be configured to process the document messages in any suitable fashion, including processing the messages from one or more message queues in a serial manner, processing updates incrementally (e.g., in batches of documents at predetermined time intervals), etc.

In an embodiment, the distributed data source manager 112 is configured to provide an interface to the data graph manager 114 via which the documents streams (e.g., a set of document streams corresponding to the input document streams received from the data sources). are transmitted. In an embodiment, the distributed data source manager 112 is configured to adapt the documents received from the data sources to the set of document streams including document records containing data updates or information identifying document records to be deleted. In an embodiment, the distributed data source manager 112 can refresh the data from the data sources to identify data updates and synchronize the document streams following a configuration change. In an embodiment, the distributed data source manager 112 can maintain and apply a set of stream rules that identify one or more fields of the documents that are to be monitored for purposes of transmitting to the data graph manager 114 for further processing. In an embodiment, example fields include, but are not limited to, a name field, a project field, a source field, a type field, an account field, a subaccount field, a filter field, a label field, etc. In an embodiment, the distributed data source manager 112 applies the stream rules to identify a set of data from the documents corresponding to at least the fields identified by the one or more stream rules.

In an embodiment, the document format manager 115 of the data graph manager 114 can perform one or more input transformation functions with respect to the document messages received from the multiple data sources. In an embodiment, the document format manager 115 maintains and applies one or more input transform functions representing instructions regarding processing of an incoming document message according to one or more transformation definitions (e.g., a default transformation definition, a transformation corresponding to an arbitrary data-interchange format that provides an organized, human-readable structure (e.g., a JSON transformation), etc.). In an embodiment, the input transformation function can include a defined schema for formatting the data included in the document message received via the input document streams. The transformed document messages (e.g., the result of the input transformation function) establish a uniform or defined input schema (e.g., organized set of fields and corresponding data values) for further processing by the data graph manager 114.

In an embodiment, the merge manager 116 receives the set of transformed document streams (provided by the multiple different data sources) and merges the multiple streams of documents for incorporation into a corresponding user data graph stored in a data graph database 117. In an embodiment, the data graph manager 114 merges the data of the transformed input document into the corresponding nodes of the user data graph. In an embodiment, the input data document received from a data source (e.g., in a format defined by the data source) is parsed to enable transformation into the transformed document schema where each document includes one or more graph key properties which identify a corresponding node or relationship in a user data graph. In an embodiment, the one or more graph key properties provide information to identify a graph node in accordance with one or more attributes (e.g., an authority attribute identifying who is responsible for the key, a stability attribute enabling older systems to refer to newer data, a uniqueness context attribute, an opacity attribute, etc.).

In an embodiment, the data graph manager 114 performs the merge function by fetching an existing document graph node corresponding to the identified graph key. In an embodiment, the input document can be parsed or broken down into multiple different components such as a set of one or more field-values that are to be updated, a set of one or more graph edges to create or update corresponding to reference-type values, and metadata corresponding to the data source of the document message. In an embodiment, the data graph manager 114 uses the parsed or identified portions of the document message to generate or update a graph node to merge the data into the data graph associated with a user system (e.g., an entity). Additional details relating to the streaming system are provided in U.S. patent application Ser. No. 17/167,631, filed Feb. 4, 2021, the entirety of which is incorporated by reference herein.

As shown in FIG. 1, the streams are provided by the output document generator 118 to the stream manager 134 for use in the generation of the web pages by the web page generator 132. In an embodiment, the web page generator 132 provides a processing environment for web page generation. The web page generator 132 parallelizes the page generation events so that thousands of individual web pages can be generated in parallel. Parallelization drastically increases the throughput of the streaming web page generation system 110, which results in overall faster wall time performance. The web page generator 132 distributes generation across multiple threads in a single computing machine as well as parallelize across multiple computing machines, increasing the achievable scale. By contrast, other site generation technologies typically process page generation events sequentially, rather than in parallel, and are always confined to a single machine.

The web page generator 132 executes the page generation phase (i.e., Phase 2) to generate every web page in the site. The combined output of the initial build (i.e., Phase 1) and page generation (i.e., Phase 2) results in the entire frontend of the web site, such that it is hosted to enable user systems to access the streaming web page generation system 110 via a suitable network (e.g., the Internet).

FIGS. 1-4 illustrate example web page generation modules (web page generator 132, 232, 323, and 423), according to embodiments of the present disclosure. As shown in FIG. 2, the web page generator 232 is configured to generate one or more web pages as part of a new deploy (as described in greater detail below with reference to FIG. 4). In an embodiment, the web page generator 232 sends a request to create a new stream to the stream manager 234. In response, the stream manager 234 retrieves (e.g., pulls) a set of initial data from the data graph 236.

In an embodiment, the data stored in the data graph 236 can include the same data that the web page generation and update manager 130 (e.g., data ingestion module 440 of FIG. 4) consumes from the output document generator (e.g., output document generator 118). The data graph can be stored again in the web page generation and update manager 130 for easy reprocessing, such that if a new deploy is requested for the same stream, this data can be pulled from the data graph 136 of the web page generation and update manager 130, instead of reprocessing the data through the stream manager 134 from the initial sources.

In an embodiment, the initial data is provided as part of one or more streams by the stream manager 234 to the web page generator 232. The web page generator 232 uses the streamed data to generate one or more web pages (e.g., an integration of HTML content based on the streamed data from the data graph 236.

Figure 4:
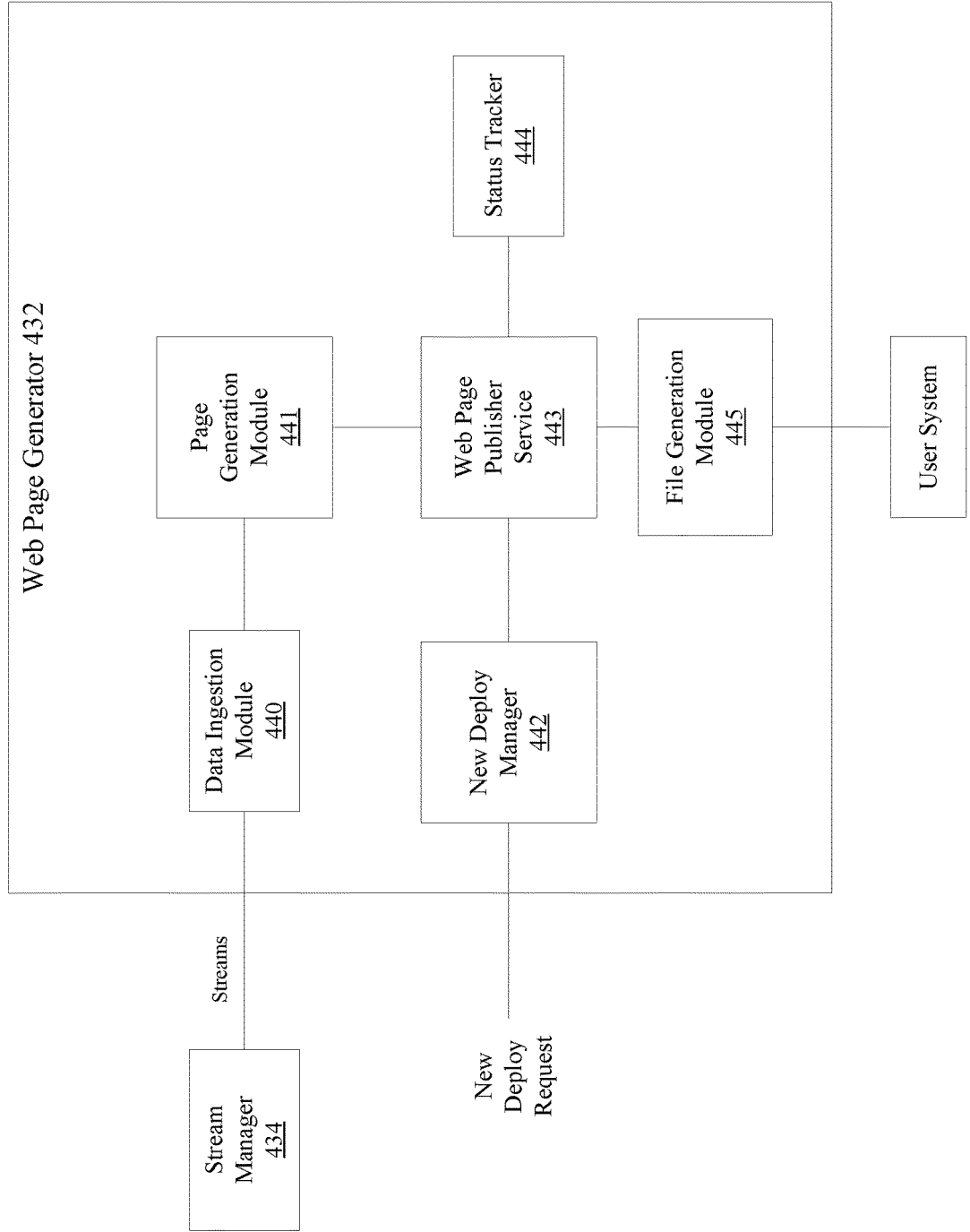
FIG. 4 illustrates an example web page generator of a streaming static web page generation system configured to generate an initial deploy and updates associated with one or more web pages of a web site of a user system, in accordance with one or more aspects of the disclosure.

FIG. 4 illustrates an example web page generator 432, according to embodiments of the present disclosure. As shown in FIG. 4, the web page generator 432 manages a series of jobs that are responsible for the generation of the web pages. In an embodiment, the data ingestion module 440 of the web page generator 432 is configured to ingest data (e.g., data streams provided by the stream manager 434). The ingested data may be associated with a "pages" destination topic. In an embodiment, the web page generator 432 is configured to generate a new deployment of web pages (i.e., Phase 2) and further generate web pages based on updated data (i.e., Phase 3).

During Phase 2, a new deploy manager 442 of the web page generator 432 manages a new deploy in response to a request to initiate and execute the web page generation processing. When a request for a new deploy is made, the new deploy manager 442 loads any relevant configuration files from a repository (e.g., using a Github graphQL query). The new deploy manager 442 parses the configuration inside the repository. In an embodiment, the configuration exists both in various files (e.g., JSON files) as well as being defined in templates. In an embodiment, the new deploy manager 442 may wait for the static asset builder (e.g., static asset builder 120 of FIG. 1) to complete for the corresponding deploy's commit. If one hasn't been initiated, the new deploy manager 442 may start a new build. Once the build completes, the new deploy manager 442 can make a call to a service (e.g., web page publisher service 443) to create a new pipeline and initiate file generation.

In an embodiment, the web page publisher service 443 can represent an entrypoint to the web page generation processing of Phase 2. When a new pipeline is requested, the web page publisher service 443 may ensure that all of the streams defined in the repository configuration for the deploy have been created and have completed their initial refresh, ensuring that the web page generator 432 has all of the documents needed to produce the full website. In an embodiment, the web page publisher service 443 may take the various stream configurations defined in the repository (e.g., either in streaming files from the stream manager 434 or files or in template format), hash the configuration, and check to determine if a stream has already been created by consulting a data structure (e.g., a streams table). If a stream has not been created yet, a request to create a stream with that configuration is made to the stream manager 434 and a new row is added to the data structure (e.g., the streams table).

In an embodiment, the web page generator 432 can include a status tracker 444 to determine if any streams that the deploy depends on have not finished. If so, the web page publisher service 443 can add one or more rows to the streams data structure associated with the incomplete stream or streams. When the streams that the deploy depends upon are all finished, document enqueuing processing can be performed. In an embodiment, once all of the streams have been completed, a request can be sent to the web page generator 432 to initiate document enqueuing, and once successfully completed, the above-identified rows can be removed from the streams table.

In an embodiment, the web page generator 432 can invoke a file generation module 445 to initiate the generation of one or more files associated with the web page generation. In an embodiment, the file generation module 445 generates multiple file types that are uploaded for serving to the user system. In an embodiment, the file generation module 445 generates asset files, stream data files, and static rendered files. In an embodiment, the asset files can be denoted by an "assets" property of a configuration file (e.g., a JSON file). The asset files may be copied verbatim from the artifact to a module for provisioning to the user system. In an embodiment, the file generation module 445 loads in the assets artifact for the build of the deploy, takes all files (e.g., recursively) in the desktop/directory in the artifact, and writes them to the topic with their path relative from the desktop/directory. In an embodiment, the file generation module 445 queues files to be used in the deploy onto a "topic" (e.g., an Apache Kafka topic) which is then read by another microservice or system that is responsible for storing the files in the cloud for serving to the end-user (e.g., the customer).

In an embodiment, the stream data files based on the stream data and are kept up to date with the data as long as the pipeline remains active. The file generation module 445 loads all of the documents for each of the streams the user system website depends on from the stream data structure and queues them onto the topic, tagged only with the instance for this new deploy (rather than all relevant instances for a data update), and denotes that the document is part of a new deploy. The stream files can undergo similar processing as the data updates, described in greater detail below, with some additional bookkeeping processing by the status tracker 444, as described below.

In an embodiment, the static rendered files are generated only during the initial file generation phase (e.g., Phase 1) and do not have any stream data applied to them. This enables template partials to be shared between stream data files and static files (e.g., a header template). The static files may be defined in a configuration file and parsed by the new deploy manager 442 when initializing the new deploy. In an embodiment, the file generation module 445 looks at the static file template entrypoints defined in the configuration and for each of these, queues an empty document with some additional tagging denoting which content and URL templates to use. In an embodiment, the static rendered files may then be processed like the stream data files.

In an embodiment, the file generation module 445 may write status logs to the status tracker 444. In an embodiment, a new deploy's initial publication can be described as a transaction of processing all of the latest documents for the deploy's streams. The status tracker 444 keeps track of the overall processing and receives event logs denoting what documents need to be processed, and later, receives event logs indicating when these documents are complete. When the file generation module 445 initiates work for a new deploy, it also sends an event per document (using the document's key as the identifier) to a status trace topic. In an embodiment, for the assets files, the system treats these files as being sourced from a single imaginary document). When all of these documents have been queued for all three file types, the file generation module 445 sends another event to the topic denoting the total document count. This is performed to enable the status tracker 444 to identify how many total documents to expect as part of the new deploy.

In an embodiment, when the page generation module 441 processes documents off of a topic during a new deploy, it also writes an event log to the status topic with the document's key as the identifier, and a collection of URL paths for each of the files generated from that document. In an embodiment, similar processing is performed in the web page publisher service 443 when processing from a feedback topic such that initial publications send an event to the status topic for each completed URL path. In an embodiment, asset files, when written to the topic by file generation module 445, may also have a corresponding event log with an imaginary document key and the URL for each file.

In an embodiment, the status tracker 444 consumes the event logs and builds up an in-memory object representing the state of the publication. In an embodiment, multiple events (e.g., a document queue event, a document processing event, a file generation event, and file publish event) are collated in this object to ensure that each document and file is accounted for. In an embodiment, once the object reaches a state where all documents have been processed, and all files generated from these documents have reported completion, the status tracker 444 can declare the initial publish complete. This declaration can be relayed to the new deploy manager 442 via a message, thus completing the lifecycle of a new deploy. At this stage, the deploy is considered "active" and the web page generator 432 can proceed with Phase 3 (i.e., the receipt and processing of data updates).

Figure 3:
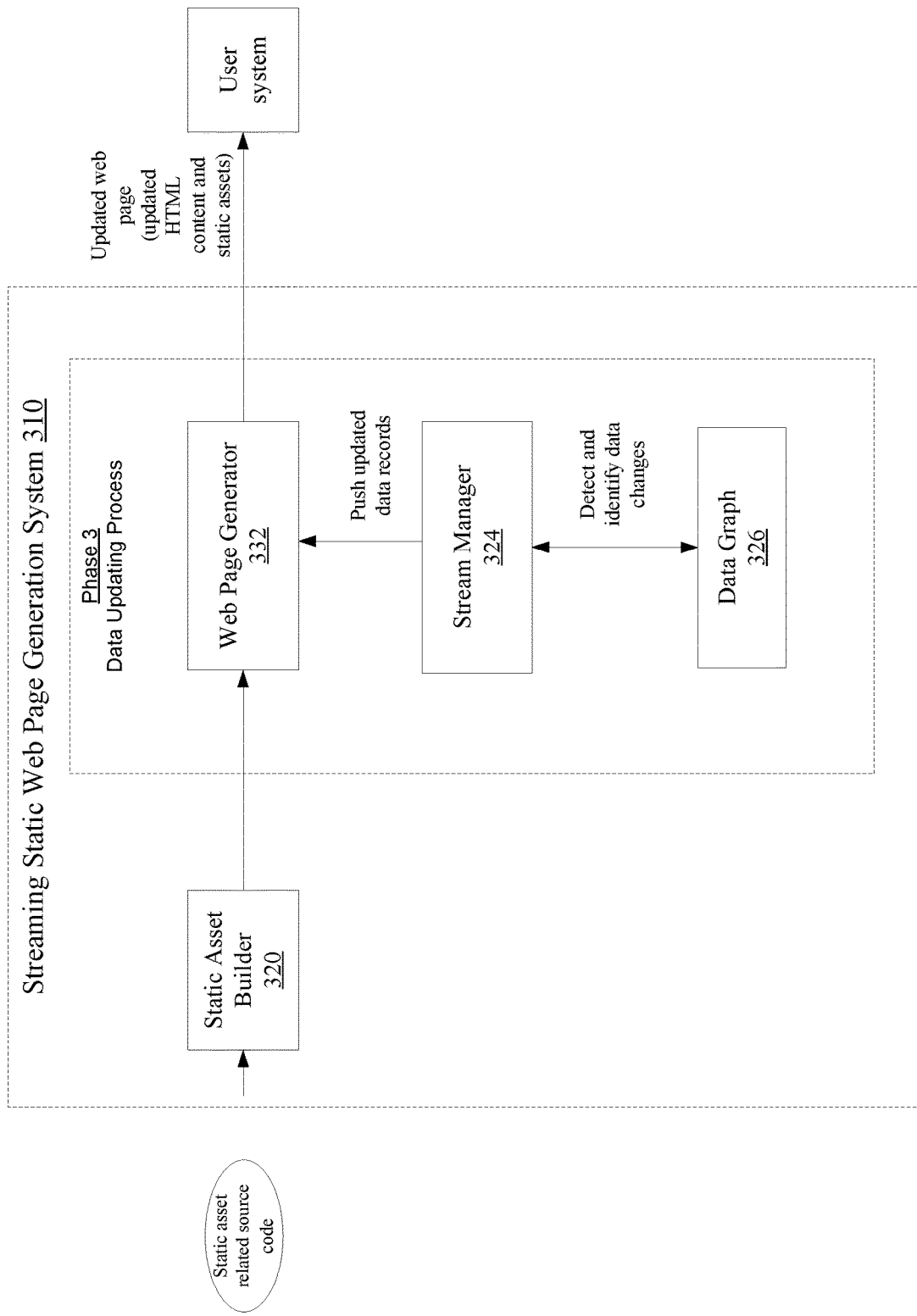
FIG. 3 illustrates an example streaming static web page generation system including components configured to execute a web page generation processing including the updating of one or more web pages based on updated data streams associated with a user system, in accordance with one or more aspects of the disclosure.

FIG. 3 illustrates an example static system 310 configured to execute a data updating process (e.g., Phase 3), according to embodiments of the present disclosure. In an embodiment, phases 2 and 3 may be performed by the same static system (e.g., static system 110, 210, 310, or 410). In an embodiment, in phase 3, the static system 310 executes a data updating process to process data updates (e.g., updates to the data graph 326 that impact or relate to one or more aspects of the web pages) to generate updated web pages (e.g., updated HTML content and static assets) to provision to a user system.

The third phase includes the processing of ongoing data updates, according to embodiments of the present disclosure. The data updates phase is responsible for regenerating particular web pages, whenever individual records in the external data source are updated. Unlike the initial build and page generation phases which are finite processes that terminate, the data updates phase is ongoing for the lifecycle of a deployment. The streaming static web page generation system can continually update web pages based on data pages until the deployment is taken down. The page generation sub-system is also responsible for executing data updates.

According to embodiments, the processing environment for data updates has a few important optimizations. First, updated web pages are generated incrementally. Rather than regenerating the entire website when a single data record is updated, the system identifies individual web pages that need to be updated and only regenerates those web-pages. Next, since the static assets are already built, the streaming static web page generation system does not need to rebuild them. The streaming static web page generation system can use existing assets from the initial build and simply render the new HTML. Recall that static asset generation can be time-consuming, since dependencies need to be imported and executed. Other typical deployment systems require you to run the static asset compilation step every time a data record is updated. In contrast, the streaming static web page generation system only needs to re-render the individual HTML based on the latest data (e.g., the data updates). In an embodiment, the data updates can be parallelized. The streaming static web page generation system can incrementally update thousands of individual web pages in parallel— each being rendered and deployed in seconds. This results in a near real-time sync between data updates in the source data system and updated web pages (e.g., web pages generated to include the updated HTML content based on the data updates). According to embodiments, the streaming static web page generation system can scale to, for example, hundreds of thousands of updates per minute.

As shown in FIG. 3, a stream manager 324 of the static system 310 can interact with the data graph 326 to detect and identify data changes in the data graph 326 that relate to one or more streams associated with web pages of a user system. In an embodiment, the identified updated data records including the data changes are provided (e.g., pushed) to the web page generator 332, which in turn generates updated web pages for the website of the user system.

With reference to FIG. 4, in an embodiment, once all needed streams are set up, the web page publisher service 443 may add the pipeline's configuration to enable subsequent data updates to be processed in Phase 3 by the data ingestion module 440. In an embodiment, when an entity (e.g., data object of the data graph 136) is added, updated, or removed from the stream, a document with the entity's data is appended to a streams topic (e.g., a Kafka topic). In an embodiment, the data ingestion module 440 receives a document and, in response, uploads both the new document and a "difference" file comparing the new document to the previously known document with the same key to a storage location. In an embodiment, the difference file is generated after fetching the old document from the stream table. In an embodiment, the data ingestion module 440 inserts the new document into the stream table and queries a set of active pipelines (e.g., persisted in memory through one or more callback functions) to determine if the particular document's stream is associated with any pipeline. If the document's stream is associated with a pipeline, for each pipeline it is used for, the data ingestion module 440 generates an activity identifier and uses an activity log to create a new activity with the activity identifier, which may queue an event on the associated activity log topic. The inbound document is then queued onto a web page generation processing topic tagged with the associated pipeline/activity identifier pairs. In an embodiment, the activity identifier may be used as a correlation identifier that is passed along the entire web page generation and data update processing phases (e.g., to correlate timings and errors).

In an embodiment, the page generation module 441 consumes the web page generation topic. Each of these documents may result in one or more generated files for each of the pipelines they are tagged for. The page generation module 441 loads the pipeline information and downloads the associated template artifact from the artifact repository (e.g., GCP storage). The page generation module 441 can then create a composite templates object for any and all templating languages defined in the repository and iterates over the various "features" defined in the repository's configuration (e.g., either in the streams configuration file or a template file). In an embodiment, a feature is a pair of template entry points for a given templating language—one for the generated web page's content and one for the web page's path (e.g., uniform resource locator (URL) path). In an embodiment, the page generation module 441 also registers various helper methods that can be called by the various languages (e.g., RTF formatters, translation helpers, etc.), and appends "global" data to the document (sourced from a global file in the artifact). The page generation module 441 renders the output file by applying the document's data to the two entry points using the template bundle. For each of the rendered files, the page generation module 441 records a generation complete event to an activity log, and if there was an error, an additional error event. If the generation was successful, the rendered files are queued on the topic and tagged with one or more of the activity identifier, instance identifier, and path identifier.

In an embodiment, the page generation module 441 receives and consumes a message or event to the topic indicating and denoting the success or failure of the publication of the file. For files published due to a data update, the page generation module 441 records a publish complete event to an activity log. If there was an error, the page generation module 441 also records a publish failure event. At this stage of the process, the data update is completed and the updated web pages are generated for the website of the user system.

Figure 5:
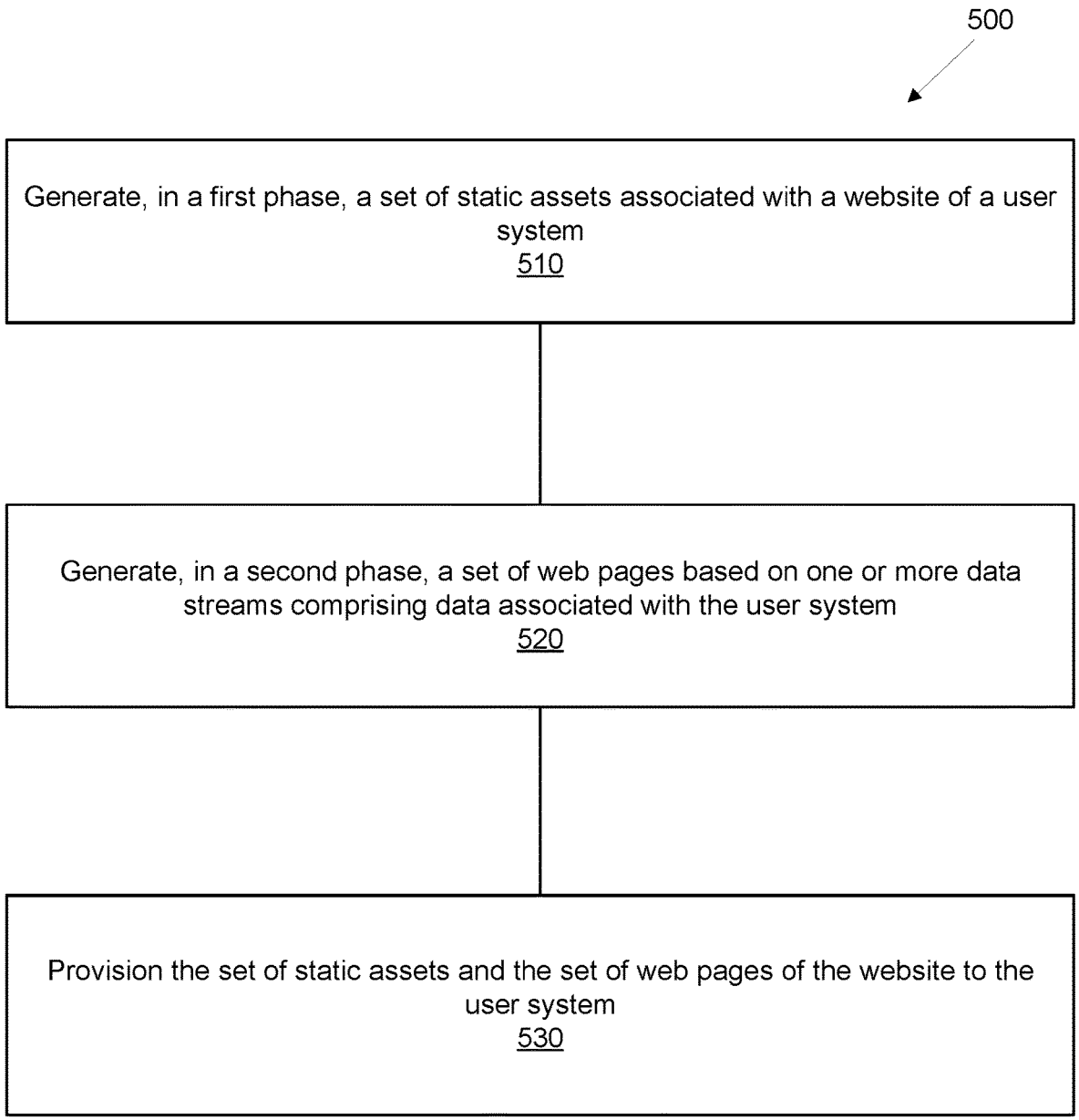
FIG. 5 illustrates an example method of generating a web site including one or more static assets and one or more web pages based on streaming data associated with a user system, in accordance with one or more aspects of the disclosure.

FIG. 5 illustrates a flow diagram relating to an example method 500 including operations performed by a streaming static web page generation system (e.g., streaming static web page generation system 110, 210, and 310 of FIGS. 1, 2, and 3, respectively, according to embodiments of the present disclosure. It is to be understood that the flowchart of FIG. 5 provides an example of the many different types of functional arrangements that may be employed to implement operations and functions performed by one or more modules of the streaming static web page generation system as described herein. Method 500 may be performed by a processing logic that may comprise hardware (e.g., circuitry, dedicated logic, programmable logic, microcode, etc.), software (e.g., instructions run on a processing device), or a combination thereof. In one embodiment, the streaming static web page generation system executes the method 500 to web pages including static assets and HTML content based on streams of data associated with a user system.

In operation 510, the processing logic generates, in a first phase, a set of static assets associated with a website of a user system. For example, the processing logic (e.g., the static asset builder 120 of the streaming static web page generation system 110 of FIG. 1). In an embodiment, the set of static assets are generated based on static asset related source code received from one or more source code providers (e.g., external libraries). In an embodiment, the static assets (e.g., artifacts) make up the "static" portion or frontend of a website (e.g., infrastructure or environmental framework) associated with a user system. In an embodiment, the frontend or static assets are independent from and do not include the HTML content or web pages based on the data associated with the user system. For example, the static assets or artifacts can include, but are not limited to, cascading style sheets (CSS), JavaScript files, font files, and images. In an embodiment, the processing logic can be generated by employing one or more frameworks and open-source libraries to generate the static assets and optimize the static assets for production as part of a build-chain.

In operation 520, the processing logic generates, in a second phase, a set of web pages based on one or more streams including data associated with the user system. For example, the processing logic (e.g., the web page generation and update manager 130 of FIG. 1) can generate web pages as part of a new deploy including an initial or first generation of web pages based on the data streams associated with the user system. In an embodiment, the data streams can be generated in accordance with method 600, described in greater detail below.

In an embodiment, the new deploy is a fully rendered version of the website, based on the toolchain, templates, and data (e.g., user system data provided via the or more data streams) at the time of the deployment. One deploy, or version of the site, is public or published to the production domain of the user system corresponding to the website. In an embodiment, when an end user (e.g., a consumer) visits the domain of the website, the end-user is presented with the contents of that deploy at the relevant URLs.

In an embodiment, in operation 520, the processing logic generates the HTML web pages that make up the website. The web pages are generated based on data records from an external data source. In an embodiment, the processing logic receives streams of data associated with a user system that are used to generate the web pages for the website of the user system. In an embodiment, operation 510 and operation 520 are executed independently (e.g., with portions of the operations performed in parallel and employing different components, modules, devices, etc. of the streaming static web page generation system.

In operation 530, the processing logic provisions the set of static assets and the set of web pages of the website to the user system. For example, the processing logic (e.g., the web page generation and update manager 130 of FIG. 1) can provision (e.g., distribute) the generated static assets (e.g., framework of the website) and web pages (e.g., the HTML content portion of the website) to a domain of the user system. The user system can provide access to one or more end-user systems to the generated website and web pages via one or more URLs.

In an embodiment, method 500 can include additional operations relating to the generation of updated web pages of the website (e.g., Phase 3, as described in greater detail above). In an embodiment, like Phase 2, the data updating phase (Phase 3) is performed independently from the initial build phase (Phase 1), as detailed above.

Figure 6:
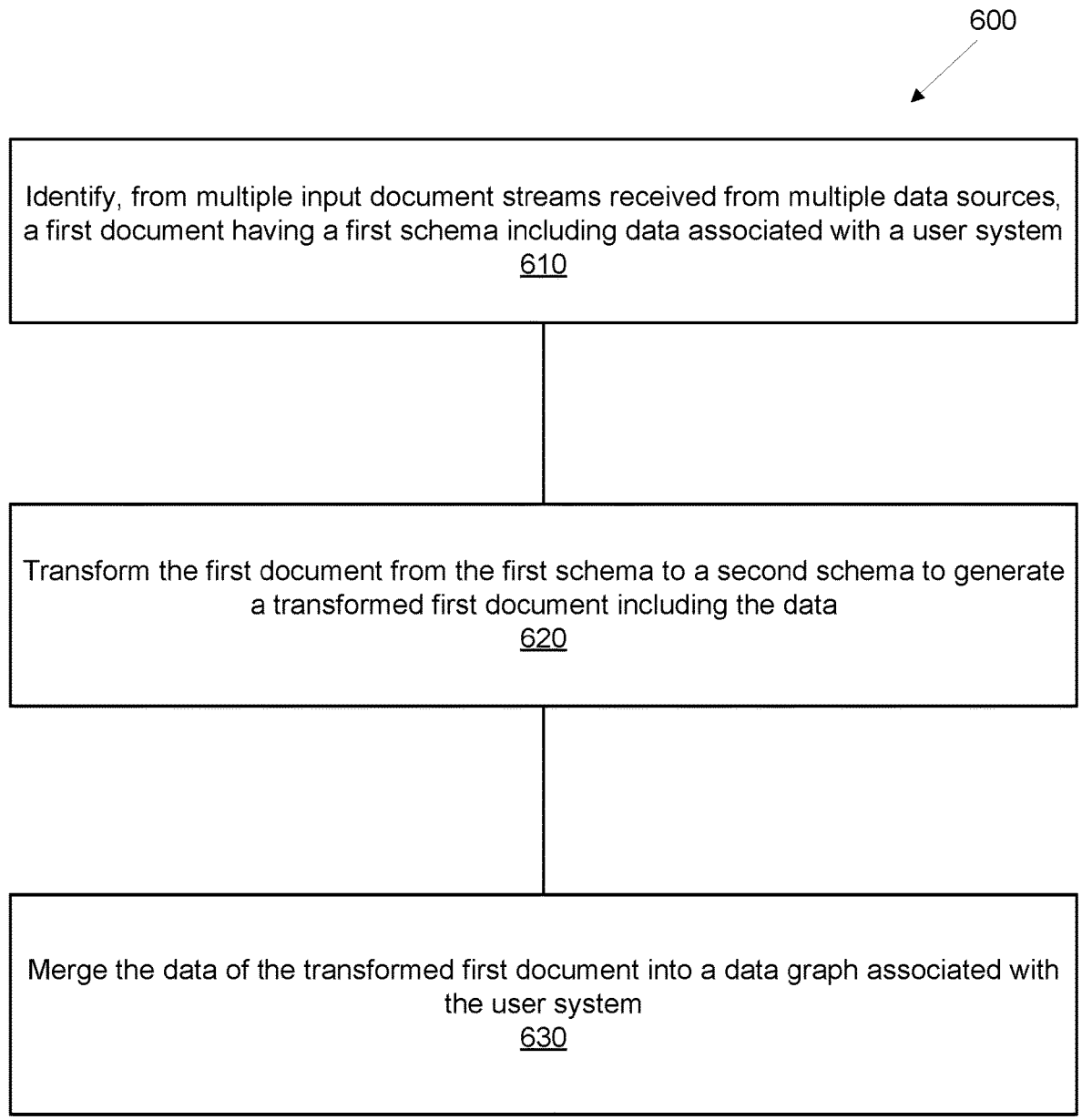
FIG. 6 illustrates an example method including merging data of input documents received via multiple input document streams associated with multiple data sources, in accordance with one or more aspects of the disclosure.

FIG. 6 illustrates a flow diagram relating to an example method 600 including operations performed by a graph merge system (e.g., graph merge system 111 of FIG. 1), according to embodiments of the present disclosure. It is to be understood that the flowchart of FIG. 6 provides an example of the many different types of functional arrangements that may be employed to implement operations and functions performed by one or more modules of the graph merge system as described herein. Method 600 may be performed by a processing logic that may comprise hardware (e.g., circuitry, dedicated logic, programmable logic, microcode, etc.), software (e.g., instructions run on a processing device), or a combination thereof. In one embodiment, the graph merge system executes the method 600 to process multiple input document streams received from multiple data sources and apply input schema transformation processing to enable merging of document data into a data graph associated with a user system for persistence in a graph database and the management of the data streams associated with a user system by a stream manager (e.g., stream manager 134 of FIG. 1) for use in generating web pages for a website associated with a user system.

In operation 610, the processing logic identifies, from multiple input document streams received from multiple data sources, a first document having a first schema including data associated with a user system. In an embodiment, the multiple input data streams (e.g., input data stream 1, input data stream 2 . . . input data stream N of FIG. 1) include respective input document messages that are received by the processing logic of the graph merge system. In an embodiment, the received document messages are each configured in accordance with an associated schema. In an example, the first document is arranged in accordance with the first schema and includes data associated with the user system. In an embodiment, the processing logic reviews the document message with the first document to determine if the message includes a particular label value.

In operation 620, the processing logic transforms the first document from the first schema to a second schema to generate a transformed first document including the data. In an embodiment, a transformation function associated with the second schema can be maintained for execution in connection with a received document message (e.g., the first document). In an embodiment, the processing logic identifies a transformation function (and associated second schema) associated with the identified label value. In an embodiment, the processing logic executes the transformation function in response to identifying the particular label value in the document message including the first document. In an embodiment, execution of the transformation function results in the generation of the first document in the second schema (e.g., the transformed first document).

In operation 630, the processing logic merges the data of the transformed first document into a data graph associated with the user system. In an embodiment, multiple data graphs corresponding to respective user systems (e.g., a first data graph associated with user system 1, a second data graph associated with user system 2 . . . an Xth data graph associated with user system X) can be maintained and stored in a graph database (e.g., data graph database 117 of FIG. 1). In an embodiment, data of the transformed first document is merged into a corresponding data graph associated with the user system in a persistent graph database.

In an embodiment, the graph merge system (e.g., the output document generator 118 of the graph merge system 111 of FIG. 1) is configured to generate a published output document stream for provisioning to a stream manager (e.g., stream manager 134 of FIG. 1) of a web page generation and update manager (e.g., web page generation and update manager 130 of FIG. 1). The generated data streams associated with a user system are used by the web page generation and update manager to generate web pages (e.g., HTML content that can be in an initial form or an updated form) for integration into a website associated with the user system corresponding to the one or more data streams. In an embodiment, the graph merge system maintains a set of one or more output specifications associated with a respective user system. In an embodiment, the set of one or more output specifications can be selected based on a label associated with the output specification. In an embodiment, each graph node is associated with a set of labels. In an embodiment, in response to an update of the data of a graph node is updated, one or more output specifications having a label that matches the one or more labels of the graph node are identified and applied. In an embodiment, each output specification can be configured to have a single label.

In an embodiment, an output specification defines or describes parameters of an output stream of document messages which the graph merge system generates and publishes to a user system. For example, an output specification can include information identifying an output name, an output schema (e.g., a description of how to compose the output document), an output label (e.g., the label is used to trigger the publication of an output document), a topic (e.g., identifying a destination onto which generated outputs are to be published), and a locale (e.g., information identifying the one or more locales for which the output document is to be generated. In an embodiment, the label of the input message merged into the data graph (e.g., represented as a node in the data graph) is reviewed in accordance with the output specifications to determine if the label of the node matches the label identified in an output specification.

In an embodiment, the output document generator 118 determines when an output document is to be published to the user system. In an embodiment, the output document generator 118 determining whether the node has a label that matches an output specification. If no match is identified, then no output document is generated. If a match is identified, the output document generator 118 determines whether a field specified by the output schema has changed, updated, added or modified (collectively referred to as "updated") since a previous publication of the corresponding output document was generated. In an embodiment, if one or more fields of the output schema have been updated, a new output document message is created for the node. In an embodiment, if one or more fields of the output schema have not been updated (e.g., no field update is identified), then the output document generate 118 suppresses the publication of a new output document. Advantageously, according to embodiments, a new output document is published in response to determining a field contained in the output schema is updated, which can then be used by the web page generation and update manager to generate updated web pages for the user system's web site (e.g., Phase 3 of the process as shown in FIG. 3). Accordingly, in an embodiment, the graph merge system can suppress (e.g., determine an output publication is not to be executed) in response to determining a field contained in the output schema has not been updated. In an embodiment, the management of the updates and determination whether one or more fields in the output schema associated with an output specification enables the selective publication of output documents including updated data, thereby resulting in computational efficiencies and savings. A further advantage is achieved by the graph merge system enabling a user system to receive published documents including updated data based on documents from multiple different data sources.

According to embodiments, as detailed above, the streaming static web page generation system of the present disclosure (1) advantageously splits the process of deploying a static website into three phases, (2) provides purpose-built environments for each phase, and (3) coordinates the deployment of these phases to deliver previously unattainable levels of performance and scalability.

In an embodiment, the streaming static web page generation system can advantageously run ongoing data updates (e.g., phase 3) on multiple deploys simultaneously. Thus, if the external data source changes, multiple deploys can receive data updates and re-generate the relevant web pages. This ensures multiple site versions can be kept up-to-date with the external data source at once. Operationally, this allows business users to publish different deploys more smoothly. For example, if a business user wants to revert to a previous version of their site, they can do so, and be sure the data on the previous version is up-to-date. In sum, the code changes and data changes are de-coupled, providing business users more operational flexibility as they iterate on the content of their site.

According to embodiments, the streaming static web page generation system performs simultaneous data streaming and page regeneration to multiple deployments. This advantageously results in operational benefits as compared to other conventional deployment systems.

Figure 7:
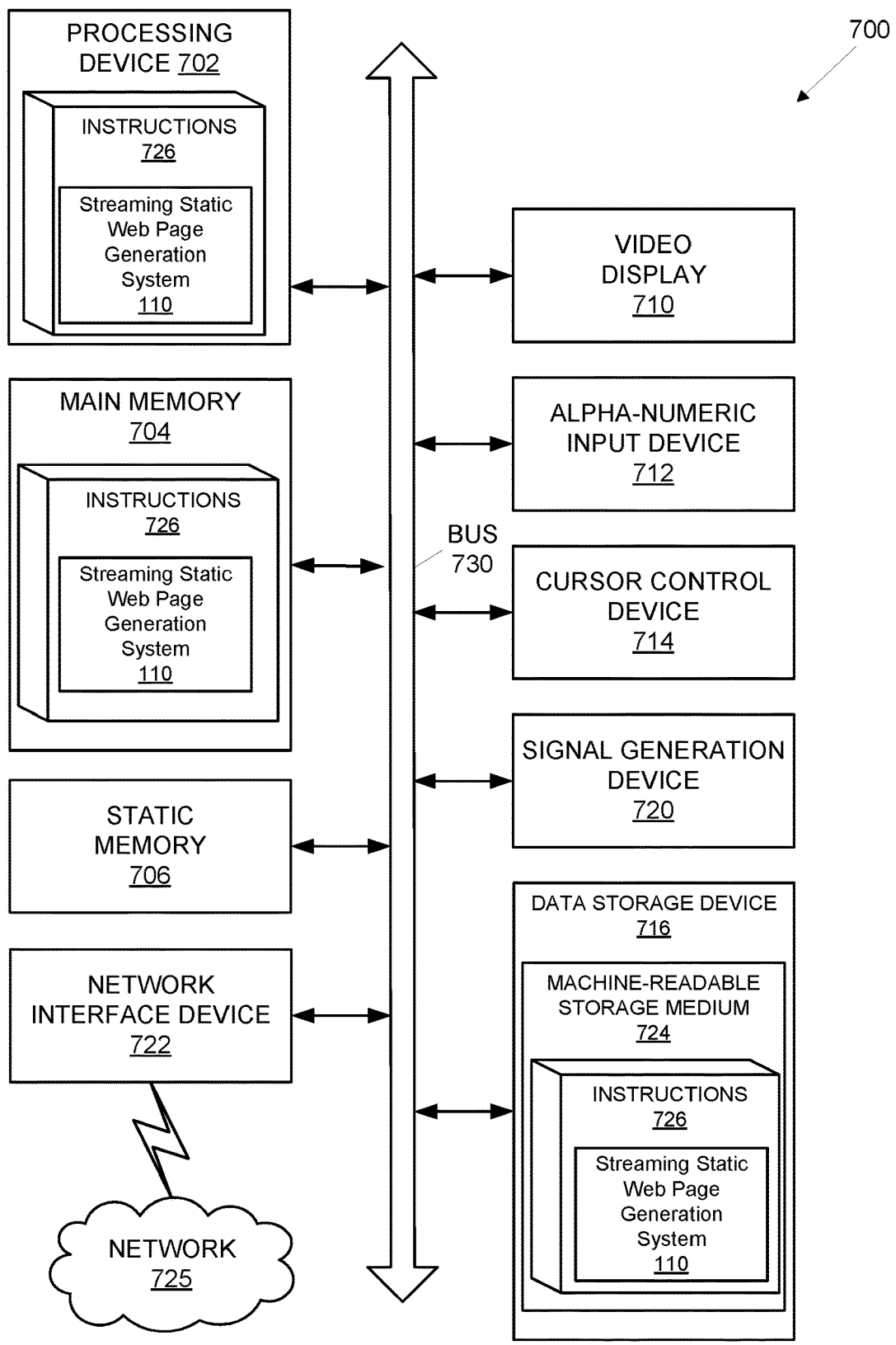
FIG. 7 illustrates an example computer system operating in accordance with some implementations.

FIG. 7 illustrates an example computer system operating in accordance with some implementations. FIG. 7 illustrates an example computer system 700 operating in accordance with some embodiments of the disclosure. In FIG. 7, a diagrammatic representation of a machine is shown in the exemplary form of the computer system 700 within which a set of instructions, for causing the machine to perform any one or more of the methodologies discussed herein, may be executed. In alternative embodiments, the machine 700 may be connected (e.g., networked) to other machines in a local area network (LAN), an intranet, an extranet, or the Internet. The machine 700 may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine 700. Further, while only a single machine is illustrated, the term "machine" shall also be taken to include any collection of machines that individually or jointly execute a set (or multiple sets) of instructions to perform any one or more of the methodologies discussed herein.

The example computer system 700 may comprise a processing device 702 (also referred to as a processor or CPU), a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a secondary memory (e.g., a data storage device 716), which may communicate with each other via a bus 730. Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 is configured to execute a search term management system for performing the operations and steps discussed herein. For example, the processing device 702 may be configured to execute instructions implementing the processes and methods described herein, for supporting a search term management system, in accordance with one or more aspects of the disclosure.

Example computer system 700 may further comprise a network interface device 722 that may be communicatively coupled to a network 725. Example computer system 700 may further comprise a video display 710 (e.g., a liquid crystal display (LCD), a touch screen, or a cathode ray tube (CRT)), an alphanumeric input device 712 (e.g., a keyboard), a cursor control device 714 (e.g., a mouse), and an acoustic signal generation device 720 (e.g., a speaker).

Data storage device 716 may include a computer-readable storage medium (or more specifically a non-transitory computer-readable storage medium) 724 on which is stored one or more sets of executable instructions 726. In accordance with one or more aspects of the disclosure, executable instructions 726 may comprise executable instructions encoding various functions of the streaming static web page generation system 110 in accordance with one or more aspects of the disclosure.

Executable instructions 726 may also reside, completely or at least partially, within main memory 704 and/or within processing device 702 during execution thereof by example computer system 700, main memory 704 and processing device 702 also constituting computer-readable storage media. Executable instructions 726 may further be transmitted or received over a network via network interface device 722.

While computer-readable storage medium 724 is shown as a single medium, the term "computer-readable storage medium" should be taken to include a single medium or multiple media. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "generating," "receiving," "transforming," "provisioning," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the disclosure also relate to an apparatus for performing the methods described herein. This apparatus may be specially constructed for the required purposes, or it may be a general-purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear as set forth in the description below. In addition, the scope of the disclosure is not limited to any particular programming language. It will be appreciated that a variety of programming languages may be used to implement the teachings of the disclosure.

It is to be understood that the above description is intended to be illustrative, and not restrictive. Many other embodiment examples will be apparent to those of skill in the art upon reading and understanding the above description. Although the disclosure describes specific examples, it will be recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
    generating, in a first phase, a set of static assets associated with a website generated by a user system, wherein the set of static assets comprises files executable to generate a frontend framework of the website;
    receiving a set of data streams from a plurality of data source systems, wherein each data stream comprises one or more data records comprising HTML content associated with the user system;
    transforming a first document of a first data record from a first schema to a second schema to generate a first transformed document;
    generating a data graph associated with the user system, wherein the data graph comprises the first transformed document and at least a portion of the HTML content of the one or more data records received via the set of data streams;
    generating, in a second phase, a set of web pages comprising at least a portion of the HTML content associated with the user system; and
    provisioning, by a processing device, the set of static assets and the set of web pages of the website to the user system, wherein the user system uses the set of static assets and the set of web pages to generate the website to be displayed to one or more end-user systems.

2. The method of claim 1, wherein the set of static assets are associated with one or more environment variables.

3. The method of claim 1, wherein the set of static assets are generated based on source code received from one or more external libraries.

4. The method of claim 1, wherein the set of static assets represents a static portion of the website and the at least the portion of the HTML content represents a dynamic portion of the website.

5. The method of claim 1, further comprising:
    merging at least a portion of the transformed first document into the data graph associated with the user system stored in a graph database.

6. The method of claim 1, wherein the set of web pages are generated at a first time based on the one or more data records associated with the user system provided by the set of data streams.

7. The method of claim 6, further comprising:
    identifying, at a second time, the set of data streams comprises updated data associated with the user system;
    generating, in a third phase, an updated set of web pages based on the set of data streams comprising the updated data associated with the user system; and
    provisioning the updated set of web pages of the website to the user system.

8. A system comprising:
    a memory to store instructions; and
    a processing device, operatively coupled to the memory, to execute the instructions to perform operations comprising:
        generating, in a first phase, a set of static assets associated with a website generated by a user system, wherein the set of static assets comprises files executable to generate a frontend framework of the web site;
        receiving a set of data streams from a plurality of data source systems, wherein each data stream comprises one or more data records comprising HTML content associated with the user system;
        transforming a first document of a first data record from a first schema to a second schema to generate a first transformed document;
        generating a data graph associated with the user system, wherein the data graph comprises the first transformed document and at least a portion of the HTML content of the one or more data records received via the set of data streams;
        generating, in a second phase, a set of web pages comprising at least a portion of the HTML content associated with the user system; and
        provisioning the set of static assets and the set of web pages of the website to the user system, wherein the user system uses the set of static assets and the set of web pages to generate the website to be displayed to one or more end-user systems.

9. The system of claim 8, wherein the set of static assets are associated with one or more environment variables.

10. The system of claim 8, wherein the set of static assets are generated based on source code received from one or more external libraries.

11. The system of claim 8, wherein the set of static assets represents a static portion of the website and the at least the portion of the HTML content represents a dynamic portion of the website.

12. The system of claim 8, the operations further comprising:
merging at least a portion of the transformed first document into the data graph associated with the user system stored in a graph database.

13. The system of claim 8, wherein the set of web pages are generated at a first time based on the one or more data records associated with the user system provided by the set of data streams.

14. The system of claim 13, the operations further comprising:
identifying, at a second time, the set of data streams comprises updated data associated with the user system;
generating, in a third phase, an updated set of web pages based on the set of data streams comprising the updated data associated with the user system; and
provisioning the updated set of web pages of the website to the user system.

15. A non-transitory computer readable storage medium comprising instructions that, when executed by a processing device, cause the processing device to perform operations comprising:
generating, in a first phase, a set of static assets associated with a website generated by a user system, wherein the set of static assets comprises files executable to generate a frontend framework of the website;
receiving a set of data streams from a plurality of data source systems, wherein each data stream comprises one or more data records comprising HTML, content associated with the user system;
transforming a first document of a first data record from a first schema to a second schema to generate a first transformed document;
generating a data graph associated with the user system, wherein the data graph comprises the first transformed document and at least a portion of the HTML content of the one or more data records received via the set of data streams;
generating, in a second phase, a set of web pages comprising at least a portion of the HTML content associated with the user system; and
provisioning the set of static assets and the set of web pages of the website to the user system, wherein the user system uses the set of static assets and the set of web pages to generate the website to be displayed to one or more end-user systems.

16. The non-transitory computer readable storage medium of claim 15, wherein the set of static assets are associated with one or more environment variables.

17. The non-transitory computer readable storage medium of claim 15, wherein the set of static assets are generated based on source code received from one or more external libraries.

18. The non-transitory computer readable storage medium of claim 15, wherein the set of static assets represents a static portion of the website and the at least the portion of the HTML, content represents a dynamic portion of the website.

19. The non-transitory computer readable storage medium of claim 15, the operations further comprising:
merging at least a portion of the transformed first document into the data graph associated with the user system stored in a graph database.

20. The non-transitory computer readable storage medium of claim 19, wherein the set of web pages are generated at a first time based on the one or more data records associated with the user system provided by the set of data streams.

* * * * *